United States Patent
Burghdoff et al.

(10) Patent No.: US 10,626,890 B2
(45) Date of Patent: Apr. 21, 2020

(54) HYDRAULIC LOCK AND METHOD FOR A HYDRAULIC SYSTEM

(71) Applicant: The Boeing Company, Chicago, IL (US)

(72) Inventors: Michael J. Burghdoff, Everett, WA (US); Mark A. Ulrich, Everett, WA (US); Erich C. Vaughan, Seattle, WA (US)

(73) Assignee: The Boeing Company, Chicago, IL (US)

( * ) Notice: Subject to any disclaimer, the term of this patent is extended or adjusted under 35 U.S.C. 154(b) by 3 days.

(21) Appl. No.: 16/002,824

(22) Filed: Jun. 7, 2018

(65) Prior Publication Data
US 2019/0376532 A1    Dec. 12, 2019

(51) Int. Cl.
| | |
|---|---|
| *F15B 13/01* | (2006.01) |
| *E05B 81/10* | (2014.01) |
| *E05F 3/22* | (2006.01) |
| *E05F 15/50* | (2015.01) |
| *F15B 13/02* | (2006.01) |
| *F15B 15/26* | (2006.01) |
| *E05C 17/00* | (2006.01) |

(Continued)

(52) U.S. Cl.
CPC .............. *F15B 13/01* (2013.01); *E05B 81/10* (2013.01); *E05C 17/003* (2013.01); *E05F 3/223* (2013.01); *E05F 15/50* (2015.01); *F15B 11/003* (2013.01); *F15B 13/015* (2013.01); *F15B 13/027* (2013.01); *F15B 15/26* (2013.01); *B64F 5/40* (2017.01); *E05Y 2900/502* (2013.01)

(58) Field of Classification Search
CPC ...... F15B 11/003; F15B 13/01; F15B 13/015; F15B 2211/30515

USPC .................................................. 91/445, 447
See application file for complete search history.

(56) References Cited

U.S. PATENT DOCUMENTS

| | | | |
|---|---|---|---|
| 3,654,833 A | * | 4/1972 | Griffiths ................ F15B 11/003 91/41 |
| 4,399,966 A | | 8/1983 | Crudden et al. |

(Continued)

FOREIGN PATENT DOCUMENTS

| | | |
|---|---|---|
| CN | 106762407 | 5/2017 |
| CN | 209041201 | 6/2019 |
| WO | 2011044191 | 4/2011 |

OTHER PUBLICATIONS

GB International Search Report dated Nov. 18, 2019; GB Application No. 1907546.4.

*Primary Examiner* — Michael Leslie
(74) *Attorney, Agent, or Firm* — Perman & Green, LLP

(57) ABSTRACT

A hydraulic lock for a hydraulic system includes a flow control valve and a second check valve. The flow control valve having a first inlet, a first outlet, a first check valve and a flow restrictor, each of the first check valve and the flow restrictor being communicably coupled to the first inlet and the first outlet and being arranged in parallel between the first inlet and the first outlet. The second check valve having a second inlet and a second outlet, the second inlet being communicably coupled to the first outlet, the second check valve further having a ball seating surface having an aperture there through, a ball, and a resilient member biasing the ball towards the ball seating surface to seal the aperture, the aperture being communicably coupled to the second inlet and the second outlet.

20 Claims, 9 Drawing Sheets

(51) Int. Cl.
*F15B 11/00* (2006.01)
*B64F 5/40* (2017.01)

(56) References Cited

U.S. PATENT DOCUMENTS

| | | | | |
|---|---|---|---|---|
| 4,905,730 A * | 3/1990 | Stoll | ............ | F16K 15/18 |
| | | | | 137/543.21 |
| 6,131,610 A * | 10/2000 | Morisako | ............ | F15B 13/01 |
| | | | | 137/601.19 |
| 6,745,789 B2 * | 6/2004 | Christiani | ............ | F15B 11/0413 |
| | | | | 91/420 |
| 8,826,799 B2 * | 9/2014 | Anscieau | ............ | F15B 20/004 |
| | | | | 91/357 |

* cited by examiner

HYDRAULIC LOCK AND METHOD FOR A HYDRAULIC SYSTEM

BACKGROUND

1. Field

The exemplary embodiments generally relate to hydraulic systems and more particularly to hydraulic locks.

2. Brief Description of Related Developments

In commercial aircraft having, for example, jet or turbofan engines (referred to herein as "engines"), it is oftentimes necessary to perform maintenance and repair work on the engine. Generally the engine includes a cowling, where the cowling is constructed as two bifurcated half cylinders (referred to herein as "maintenance access doors") that are coupled to the engine or engine mounting strut with suitable hinges so that each maintenance access door can be pivoted upwardly away from an engine core to allow maintenance personnel access to the engine core.

Generally, maintenance access doors are opened and closed manually or with hydraulic actuators. In some instances the hydraulic actuators include mechanical detent locking mechanisms that hold the maintenance access doors open. A hold open rod is provided for the manually opened/closed maintenance access doors to hold the maintenance access doors open. In some instances, such as where the hydraulic actuators include the mechanical detent locking mechanisms, the hold open rod may be provided as a secondary lock that provides a secondary load path for holding a respective maintenance access door open. The use of the hold open rod requires operator engagement to deploy and remove which increases time required to open and close the maintenance access doors. Inclusion of the hold open rod also increases the part count of the engine and increases weight. Moreover, the hold open rod is a wearable item that may need replacing at regular (or irregular) intervals which increases cost of maintenance.

In lieu of the hold open rod in hydraulically operated maintenance access door systems, additional operational modes for a pump manifold for the hydraulic actuator and switches corresponding to the pump manifold operational modes may be added to provide a hydraulic lock within, for example a complex pump unit powering the hydraulic actuator. However, these modifications to the complex pump and switches increases costs (compared to actuation systems that use bare pumps and switches, such as in those systems using the hold open rod) and complexity of the hydraulic actuator actuation system. Additional operational modes and corresponding switches may also change the operating procedure used for engine maintenance, which may lead to increased personnel training and training costs.

SUMMARY

Accordingly, apparatuses and methods, intended to address at least one or more of the above-identified concerns, would find utility.

The following is a non-exhaustive list of examples, which may or may not be claimed, of the subject matter according to the present disclosure.

One example of the subject matter according to the present disclosure relates to a hydraulic lock for a hydraulic system, the hydraulic lock comprising: a flow control valve having a first inlet, a first outlet, a first check valve and a flow restrictor, each of the first check valve and the flow restrictor being communicably coupled to the first inlet and the first outlet and being arranged in parallel between the first inlet and the first outlet; and a second check valve having a second inlet and a second outlet, the second inlet being communicably coupled to the first outlet, the second check valve further having a second ball seating surface having an aperture there through, a second ball, and a second resilient member biasing the second ball towards the second ball seating surface to seal the aperture, the aperture being communicably coupled to the second inlet and the second outlet.

Another example of the subject matter according to the present disclosure relates to a hydraulic system comprising: a hydraulic fluid reservoir; an actuation cylinder; and a hydraulic lock disposed between the hydraulic fluid reservoir and the actuation cylinder so as to fluidly couple the hydraulic fluid reservoir to the actuation cylinder, the hydraulic lock including a flow control valve having a first inlet, a first outlet, a first check valve and a flow restrictor, each of the first check valve and the flow restrictor being communicably coupled to the first inlet and the first outlet and being arranged in parallel between the first inlet and the first outlet; and a second check valve having a second inlet and a second outlet, the second inlet being communicably coupled to the first outlet, the second check valve further having a ball seating surface having an aperture there through, a ball, and a resilient member biasing the ball towards the ball seating surface to seal the aperture, the aperture being communicably coupled to the second inlet and the second outlet.

Still another example of the subject matter according to the present disclosure relates to a method for operating a hydraulic lock in a hydraulic system, the method comprising: blocking a return hydraulic fluid flow through a flow control valve with a first check valve of the flow control valve where the first check valve directs the return hydraulic fluid flow through a flow restrictor, of the flow control valve, the first check valve and the flow restrictor being arranged in parallel between a first inlet and a first outlet of the flow control valve; holding a second ball of a second check valve away from a second ball seating surface of the second check valve, against a biasing force of a second resilient member biasing the second ball towards the second ball seating surface, with at least a hydraulic fluid gauge pressure, in a second manifold of the second check valve, effected by the flow restrictor; and seating the second ball against the second ball seating surface to close a second inlet of the second check valve when a differential pressure based force exerted on the second ball of the second check valve, effected by the flow control valve, is substantially zero or less than a biasing force of the second resilient member.

BRIEF DESCRIPTION OF THE DRAWINGS

Figure 1:
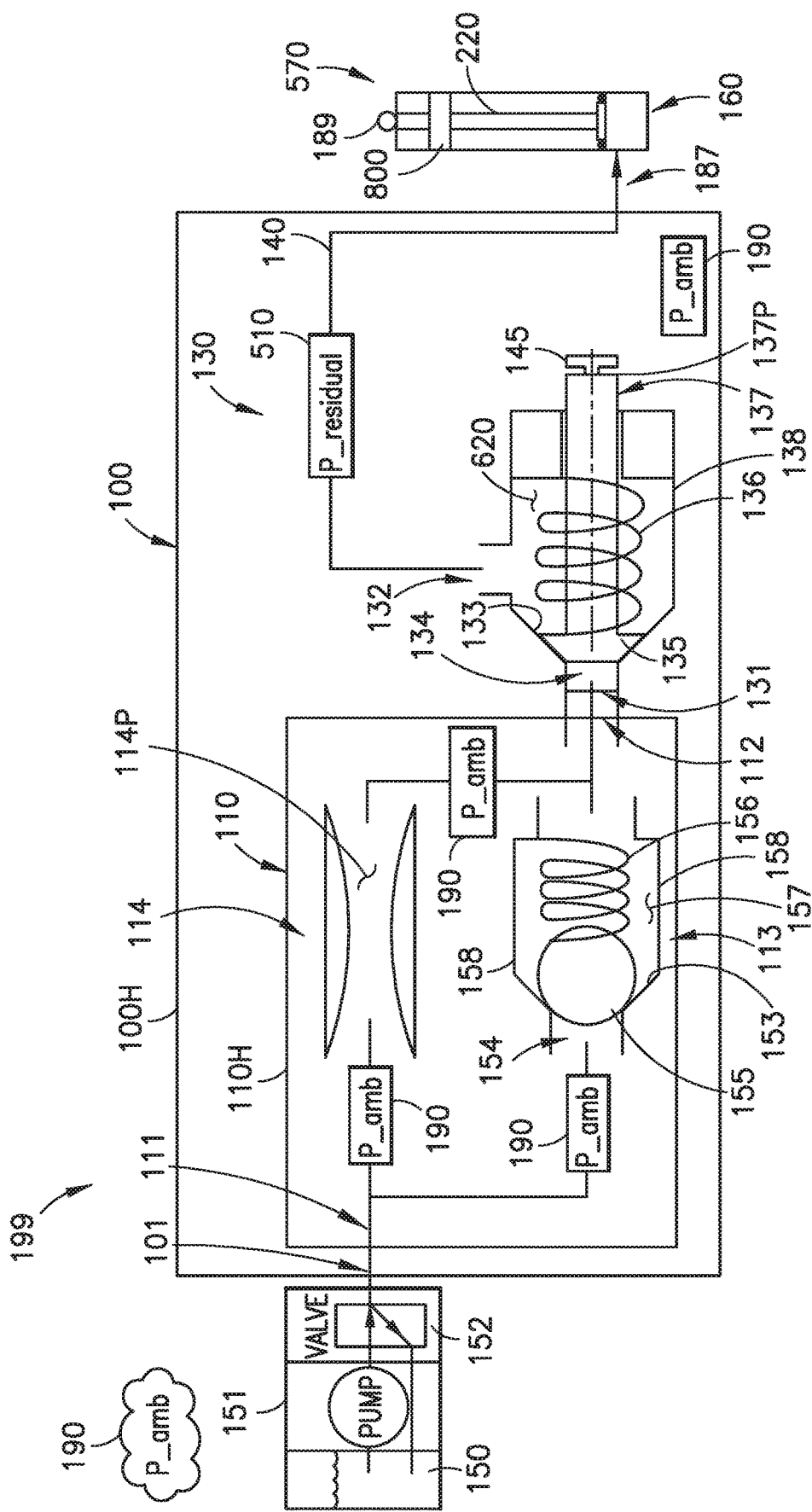
Figure 2:
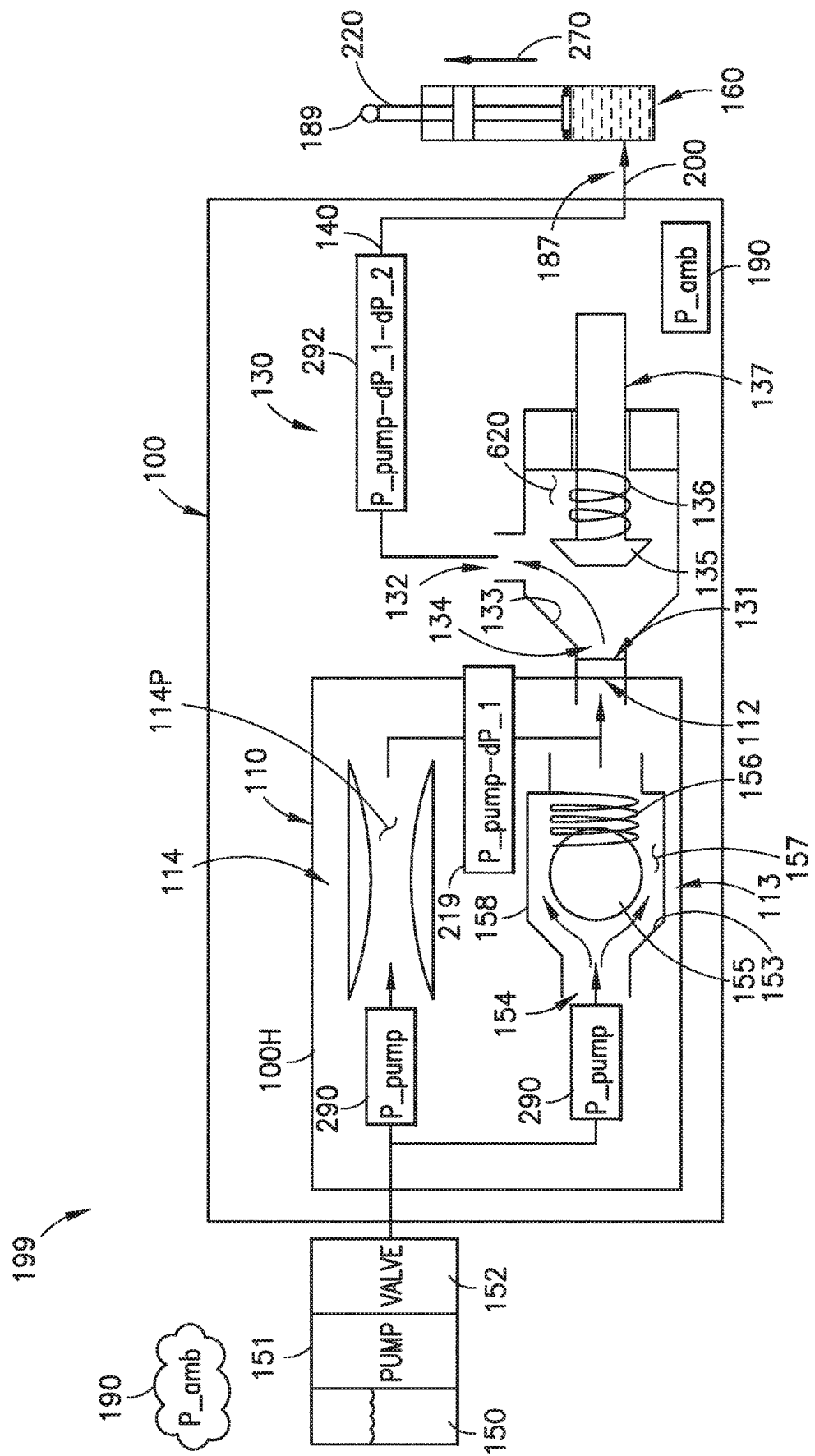
Figure 3:
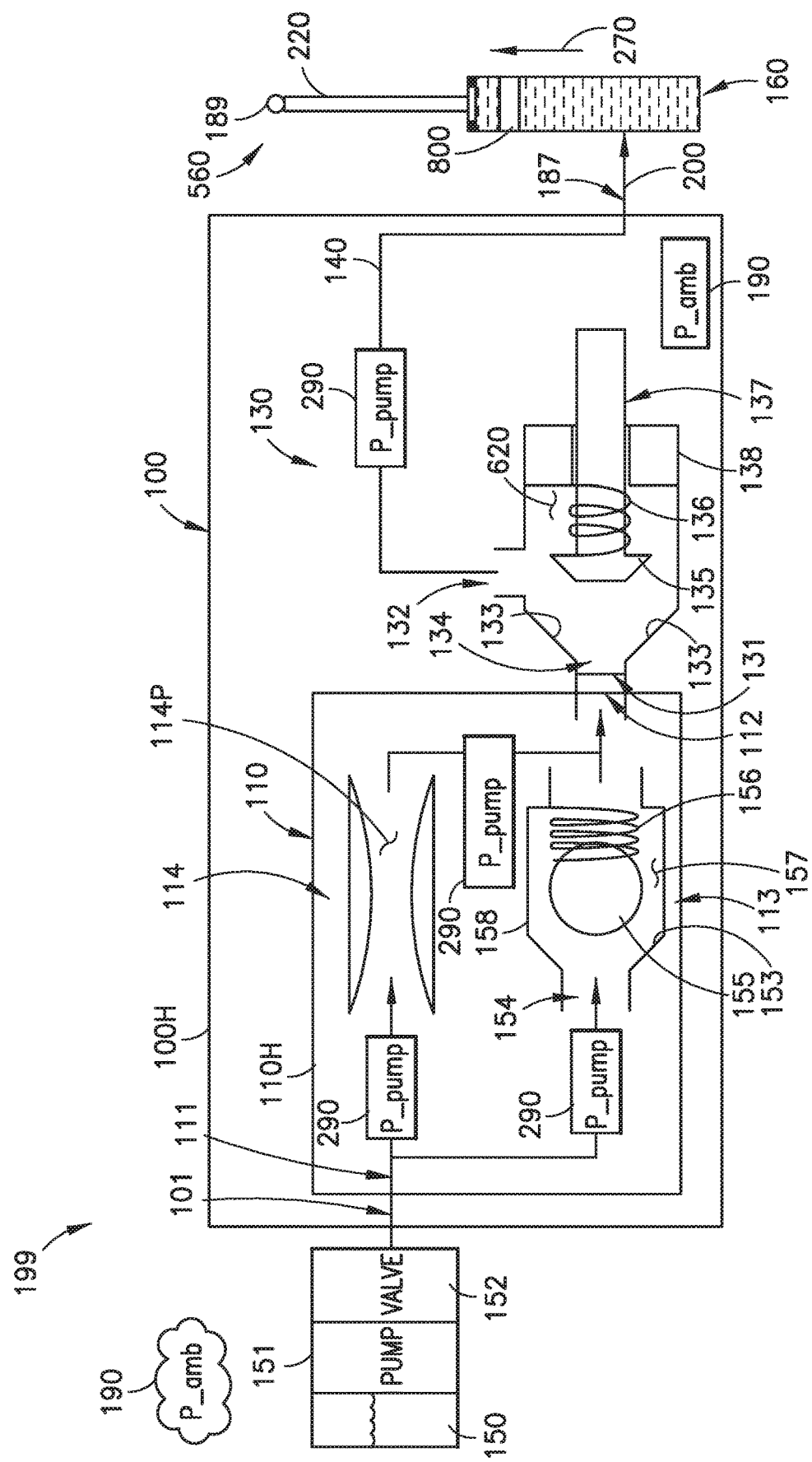
Figure 4:
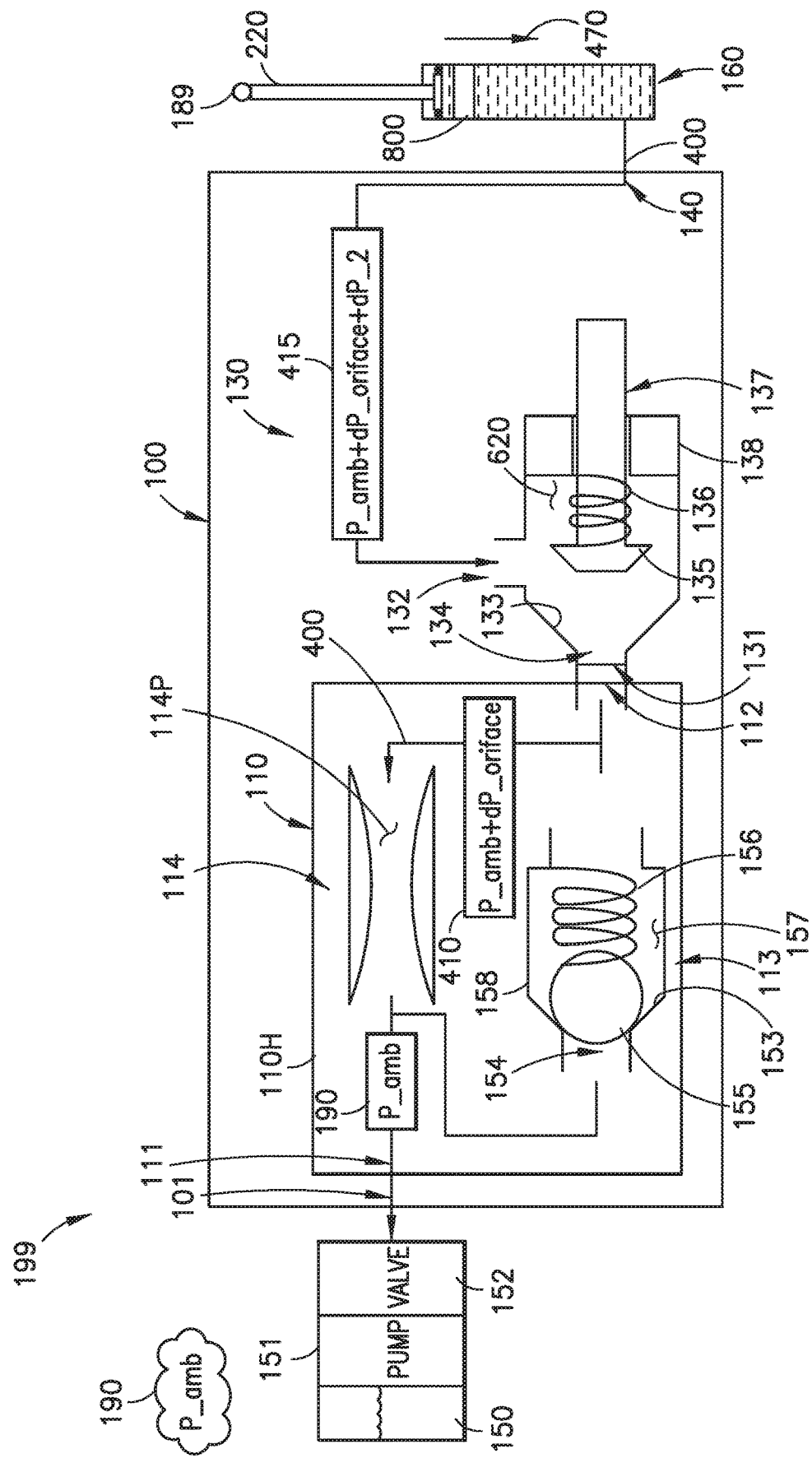
Figure 5:
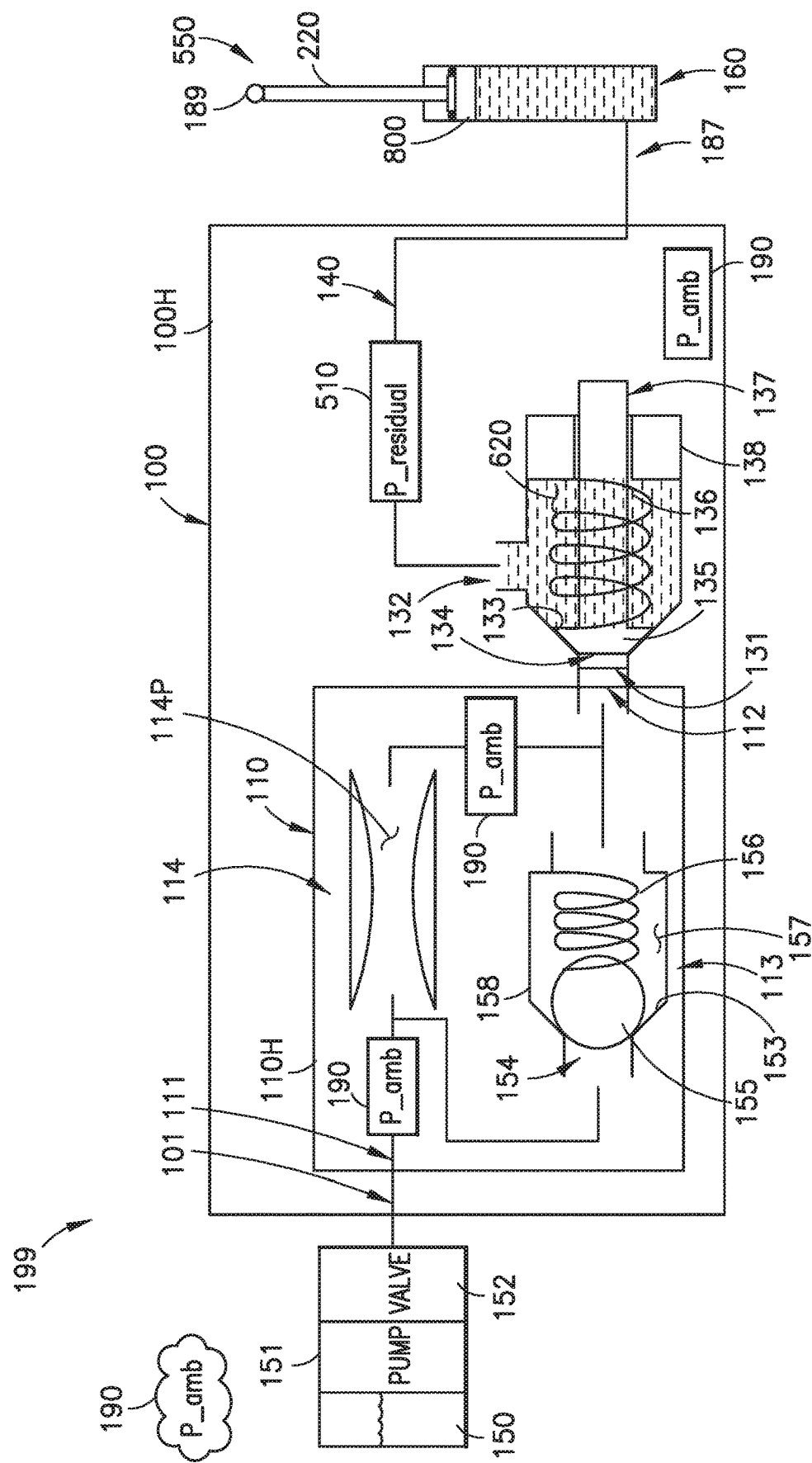
Figure 6:
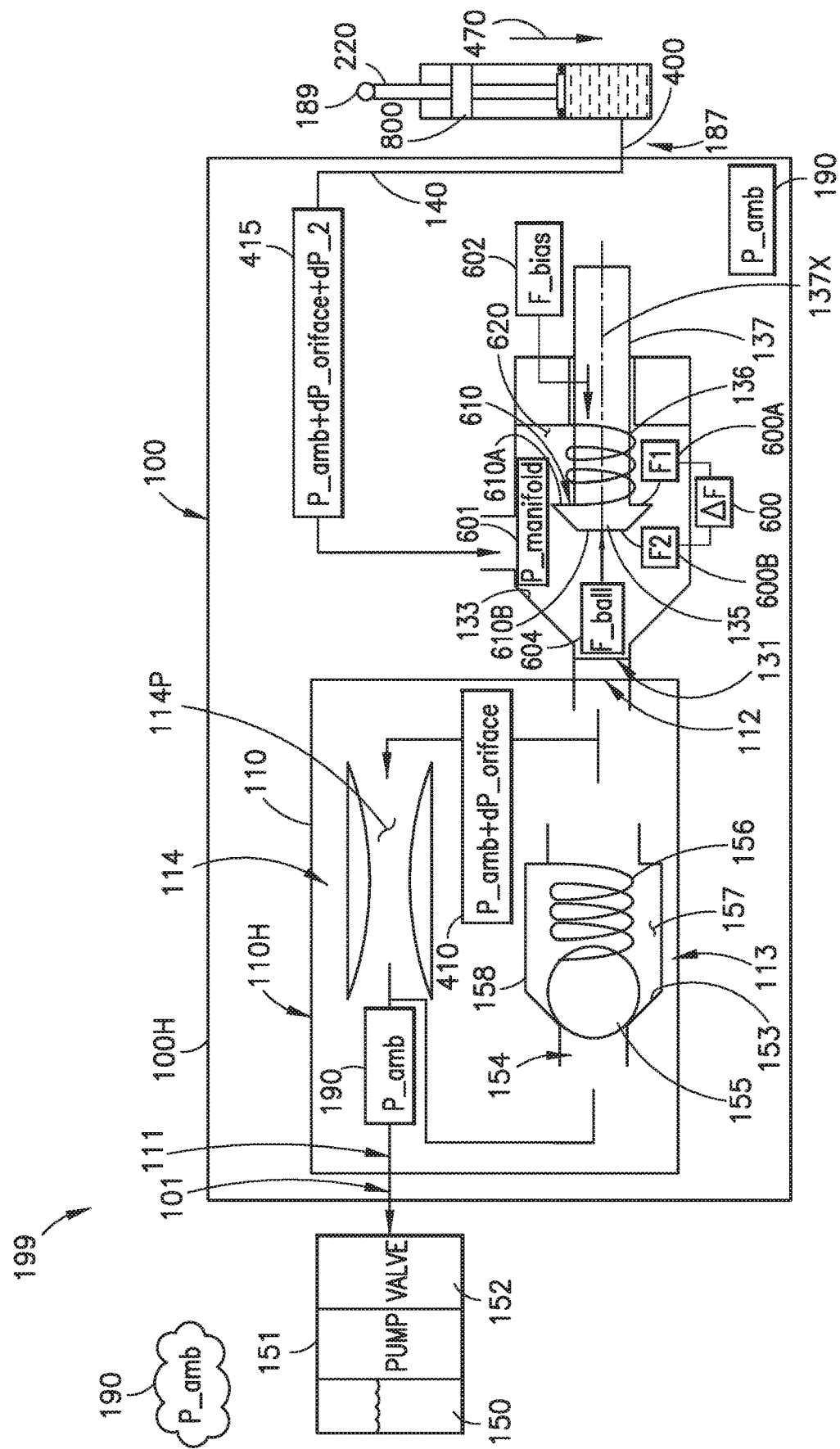
Figure 7:
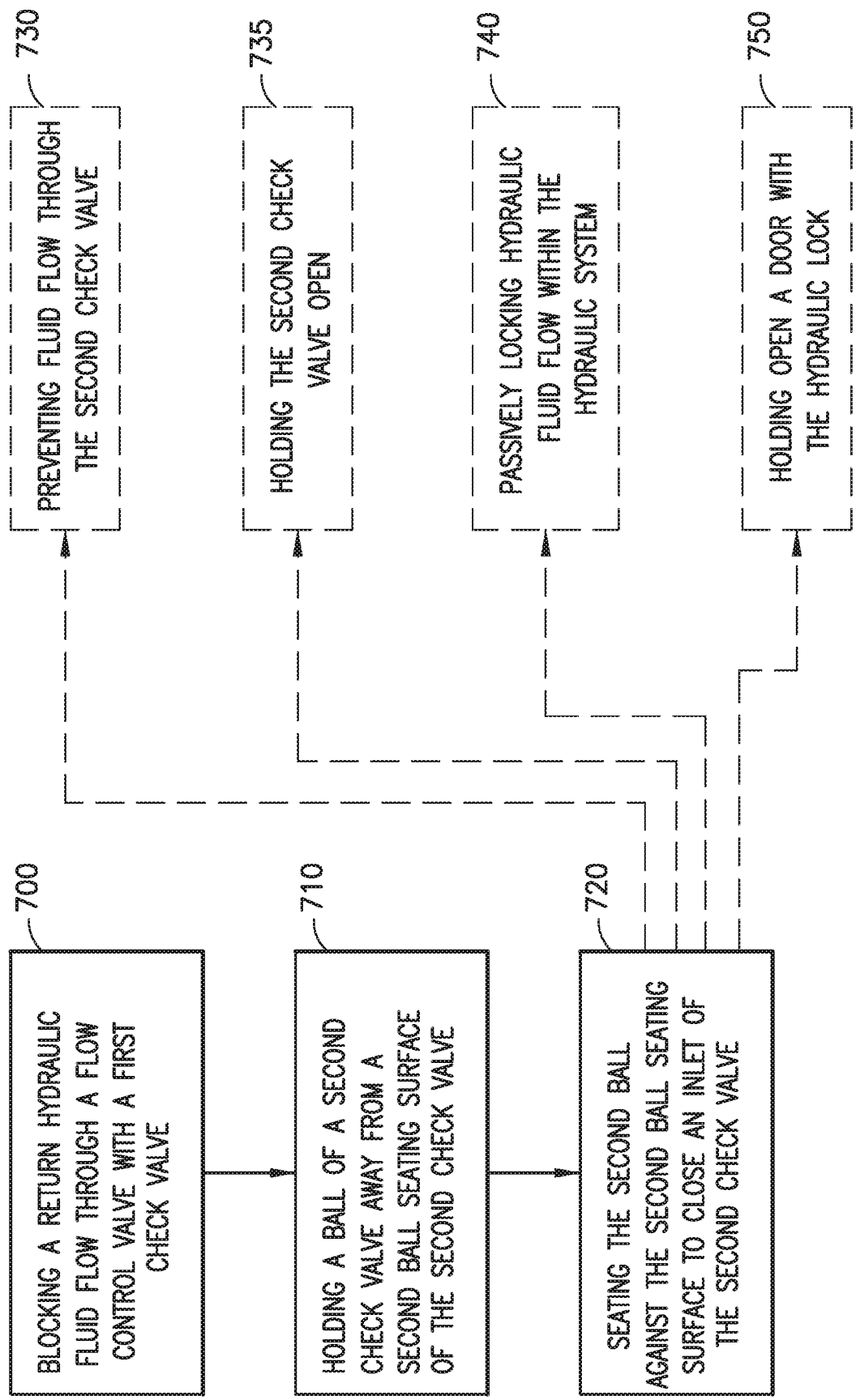
Figure 8A:
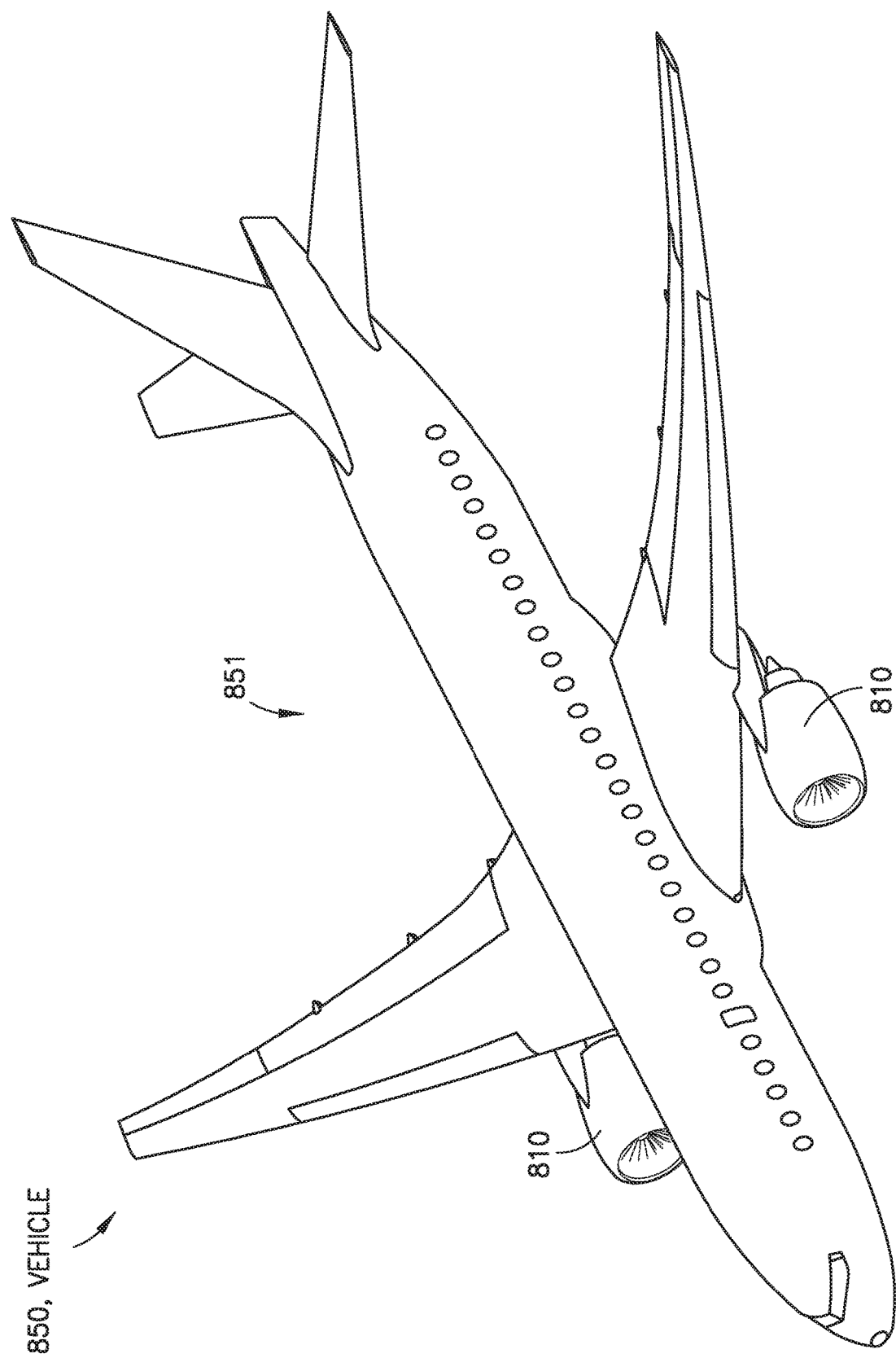
Figure 8C:
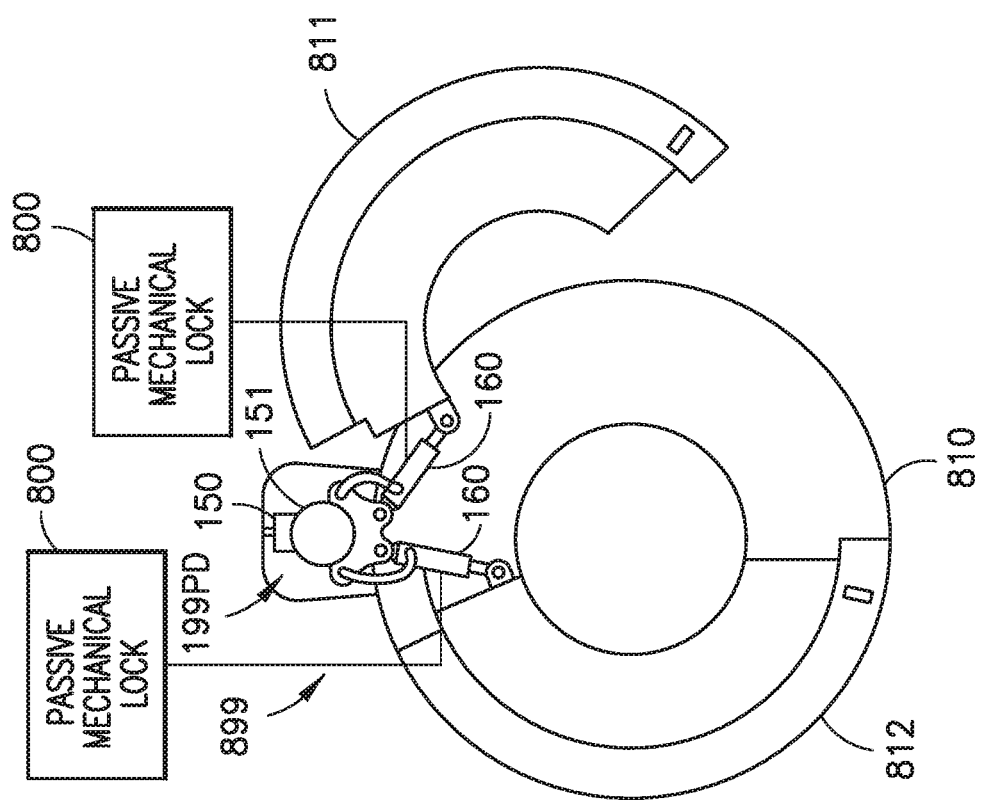
Figure 8B:
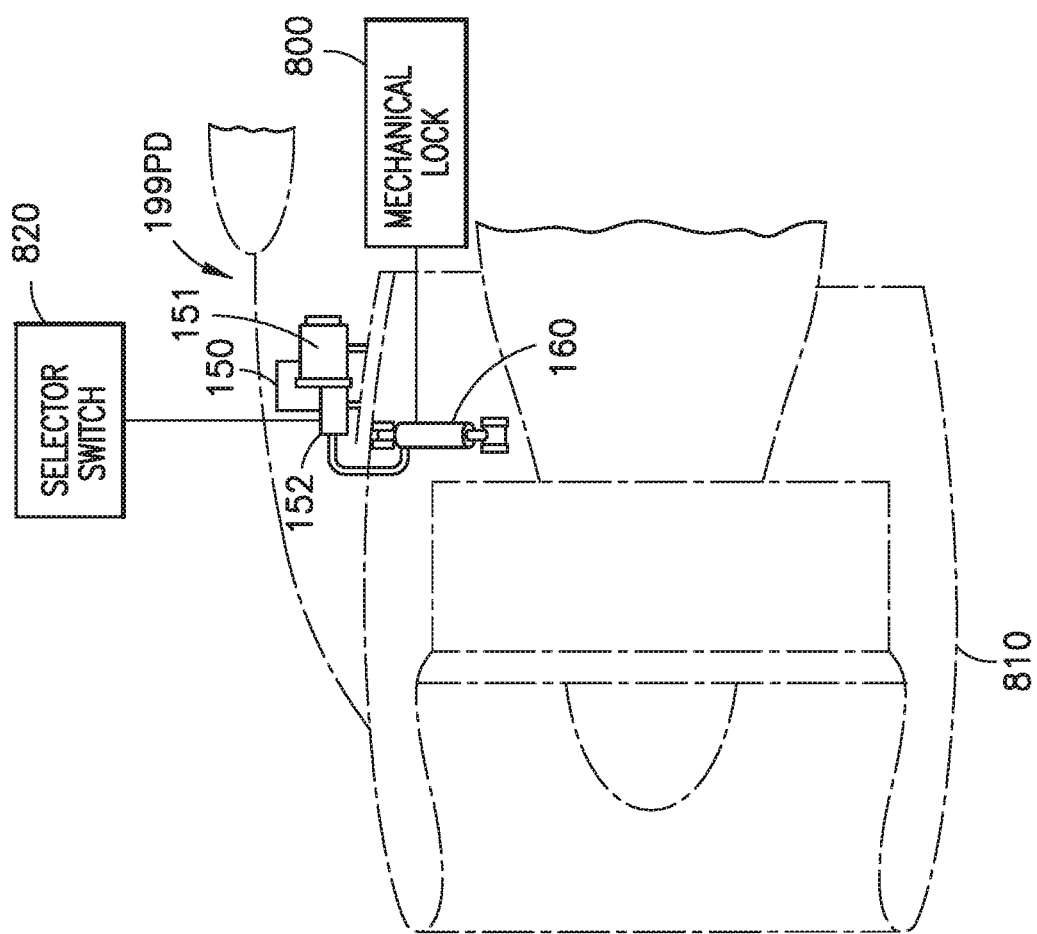

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic diagram of a hydraulic system including a hydraulic lock in a closed configuration in accordance with aspects of the present disclosure;

FIG. 2 is a schematic diagram of the hydraulic system of FIG. 1 with the hydraulic lock in a load opening configuration in accordance with aspects of the present disclosure;

FIG. 3 is a schematic diagram of the hydraulic system of FIG. 1 with the hydraulic lock in a load over extension configuration in accordance with aspects of the present disclosure;

FIG. 4 is a schematic diagram of the hydraulic system of FIG. 1 with the hydraulic lock in a configuration for seating a mechanical lock in accordance with aspects of the present disclosure;

FIG. 5 is a schematic diagram of the hydraulic system of FIG. 1 with the hydraulic lock in a mechanically locked configuration in accordance with aspects of the present disclosure;

FIG. 6 is a schematic diagram of the hydraulic system of FIG. 1 with the hydraulic lock in a load closing configuration in accordance with aspects of the present disclosure;

FIG. 7 is a flow diagram of an exemplary method for locking a hydraulic system accordance with aspects of the present disclosure;

FIG. 8A is a schematic illustration of a vehicle incorporating aspects of the present disclosure;

FIG. 8B is a schematic illustration of a portion of the vehicle of FIG. 8A incorporating aspects of the present disclosure; and FIG. 8C is a schematic illustration of a portion of the vehicle of FIG. 8A incorporating aspects of the present disclosure.

DETAILED DESCRIPTION

Illustrative, non-exhaustive examples, which may or may not be claimed, of the subject matter according to the present disclosure are provided below.

Referring to FIG. 1, the aspects of the present disclosure provide for a hydraulic lock 100, a hydraulic system 199 including the hydraulic lock 100 and a method for operating the hydraulic lock 100. The hydraulic lock 100 may be employed in any suitable hydraulic system, such as hydraulic system 199, where a secondary load path is desired for holding open any suitable load 189, such as an engine maintenance access door 811, 812 (FIG. 8B). The hydraulic lock 100 (as a standalone unit) or as part of the hydraulic system 199 may be incorporated into any suitable vehicle 850 (FIG. 8A), such as commercial aircraft 851 (FIG. 8A), land vehicles, space vehicles, maritime vessels, etc.; while in other aspects, the hydraulic system 199 may be incorporated into any suitable device/apparatus where a secondary load path for holding the load 189 in a predetermined position may be desired such as in machine tools, architectural structures (e.g., buildings, garages, etc.), amusement park rides, etc.

The aspects of the present disclosure provide for an improvement over conventional locking mechanisms used in hydraulic systems by providing a passive secondary locking mechanism that may not require operator engagement to actuate or de-actuate. The passive secondary locking mechanism maintains current operating procedures (such as for performing engine maintenance and repairs) as there are no additional operator movements or steps for actuating and de-actuating the hydraulic lock 100. The hydraulic lock 100 described herein may be implemented in any suitable hydraulic system 199, including systems with a single hydraulic path, without modification of the hydraulic system 199, other than the insertion of the hydraulic lock 100 within a fluid flow path of the hydraulic system 199. As such, the aspects of the present disclosure provide the passive secondary locking mechanism that can be installed in new hydraulic system designs and/or be retrofit into existing hydraulic systems (e.g., hydraulic systems already installed and operating within a vehicle, structure, etc.) without modification of hydraulic actuators, pumps, switches, or other components of the existing hydraulic system which decreases costs (and weight) when compared to the conventional secondary locking mechanisms.

Still referring to FIG. 1, the hydraulic lock 100 for a hydraulic system 199 includes a flow control valve 110 and a second check valve 130 that are positioned relative to each other in series. In one aspect, the hydraulic lock 100 includes a common housing 100H in which both the flow control valve 110 and the second check valve 130 are disposed; while in other aspects the flow control valve 110 and the second check valve 130 may not be disposed in a common housing. The flow control valve 110 includes a first inlet 111, a first outlet 112, a first check valve 113 and a flow restrictor 114, where the first inlet 111 forms or is coupled to an inlet 101 of the common housing 100H. Each of the first check valve 113 and the flow restrictor 114 are communicably coupled to the first inlet 111 and the first outlet 112 so as to be arranged in parallel, with respect to each other, between the first inlet 111 and the first outlet 112. The flow restrictor 114 may be disposed within a housing 110H of the flow control valve in any suitable manner and have any suitable configuration (e.g., such as a converging flow path, etc.) for restricting a flow of fluid through the flow restrictor 114, where a fluid passage 114P of the flow restrictor 114 is coupled to the first inlet 111 and the first outlet 112.

The first check valve 113 includes a first check valve housing 158 that forms a first manifold 157 coupled to the first inlet 111 and the first outlet 112. The first check valve 113 further includes a first ball seating surface 153 having an aperture 154 there through, a first ball 155, and a first resilient member 156 biasing the first ball 155 towards the first ball seating surface 153 to seal the aperture 154. The term "ball" as used herein with respect to the first check valve 113 and the second check valve 130 refers to any suitable stopper member having any suitable shape that mates with a respective aperture to stop a flow of fluid through the respective aperture/valve (i.e., the ball may have a spherical shape, a disc shaped, a frustoconical shape, conical shape, or any other suitable shape). The first resilient member 156 may be any suitable resilient member such as a coil spring, leaf spring, torsion spring, rubber or any other suitable structure or mechanism that biases the first ball 155 towards the first ball seating surface 153. The first ball seating surface 153 and aperture 154 may be formed by or coupled to a first check valve housing 158 in any suitable manner. In one aspect, the flow restrictor 114 and the first check valve 113 are formed in a common housing, such as housing 110H (e.g., the first check valve housing 158 forms part of housing 110H) of the flow control valve 110.

The second check valve 130, which is disposed in series with the flow control valve 110 (and hence in series with each of the first check valve 113 and the flow restrictor 114) includes a second check valve housing 138 that forms a second manifold 620 having a second inlet 131 and a second outlet 132, where the second inlet 131 of the second check valve 130 is communicably coupled to the first outlet 112 of the flow control valve 110. The second check valve 130 further includes a second ball seating surface 133 having an aperture 134 there through, a second ball 135, and a second resilient member 136 biasing the second ball 135 towards the second ball seating surface 133 to seal the aperture 134. The second resilient member 136 may be any suitable resilient member such as a coil spring, leaf spring, torsion spring, rubber or any other suitable structure that biases the second ball 135 towards the second ball seating surface 133. The second ball seating surface 133 and aperture 134 may be formed by or coupled to the second check valve housing 138 in any suitable manner. The second inlet 131, the second outlet 132 and the aperture 134 form a fluid flow path 140 through the second check valve 130, where the aperture 134 is communicably coupled to the second inlet 131 and the second outlet 132.

Referring to FIGS. 1 and 6, the second ball 135 of the second check valve 130 includes a stem 137 that extends from the second ball 135 in a direction substantially opposite the second ball seating surface 133 (or extends axially in a direction of movement of the second ball 135 as the ball is seated against and moved away from the second ball seating surface 133) so as to extend, through the second check valve housing 138 of the second check valve 130, to an ambient pressure 190 surrounding the second check valve housing 138. For example, the ball includes a surface 610 with portion 610A and another portion 610B. The stem 137 extends from the portion 610A while the other portion 610B forms a ball seating surface that interfaces with/couples to the second ball seating surface 133 for stopping fluid flow through the second check valve 130. The stem 137, in communication with the ambient pressure 190, is configured to effect a differential pressure based force 600 from the manifold 620 hydraulic fluid gauge pressure ($P_{manifold}$) 601 acting on at least the portion 610A of a surface 610 of the second ball 135 adjacent the stem 137 and the other portion 610B of the surface 610 of the second ball 135 facing the second inlet 131. For example, a net force ($F_{ball}$) 604 (see FIG. 6) can be defined as:

$$F_{ball} = (P_{manifold} * A_{ball}) - (P_{manifold} * (A_{ball} - A_{stem}) + P_{ambient} * A_{stem}) - F_{bias}$$ [eq. 1]

which can be reduced to:

$$F_{ball} = A_{stem} * (P_{manifold} - P_{ambient}) - F_{bias}$$ [eq. 2]

where $F_{ball}$ is the net force acting on the ball to keep the second check valve 130 open; $P_{manifold}$ (see FIG. 6) is the hydraulic fluid gauge pressure 601 in the second manifold 620 of the second check valve 130 between the second inlet 131 and the second outlet 132; $P_{ambient}$ is the ambient pressure 190 surrounding the second check valve housing 138; $A_{ball}$ is the projected area of the other portion 610B of the surface 610 normal to an axis 137X of the stem 137; $A_{stem}$ is a cross-sectional area of the stem 137; and $F_{bias}$ is the biasing force 602 exerted on the second ball 135 by the second resilient member 136. The differential force 600 is due to the second manifold 620 hydraulic fluid gauge pressure ($P_{manifold}$) 601 acting on the reduced surface area of the portion 610A of the surface 610 (caused by the stem 137 extending from the portion 610A) interfaced with the hydraulic fluid compared to the surface area of the other portion 610B of the surface 610 interfaced with the hydraulic fluid. A positive value for $F_{ball}$ will open the second check valve 130 and hold the second check valve 130 open until fluidic pressure within the second manifold 620 decreases so that the biasing force ($F_{bias}$) 602 substantially balances with (e.g., a substantially zero value for $F_{ball}$) or the biasing force ($F_{bias}$) 602 overcomes (e.g., a negative value for $F_{ball}$), at which point the second check valve 130 closes.

In one aspect, an operator handle 145 is coupled to a portion 137P of the stem 137 that is disposed in the ambient pressure 190 to effect one or more of manual opening and manual closing of the second check valve 130. In other aspects, the stem 137 may not include the operator handle 145.

Referring to FIGS. 1, 8A, 8B, and 8C, the flow control valve 110 and the second check valve 130 are configured to passively lock hydraulic fluid flow within hydraulic system 199. In one aspect, the hydraulic system 199 is a power door operating system 199PD. In one aspect, the power door operating system 199PD is an aircraft engine 810 door operating system 899. The hydraulic system 199 includes a hydraulic fluid reservoir 150, an actuation cylinder 160, and the hydraulic lock 100, which is disposed between the hydraulic fluid reservoir 150 and the actuation cylinder 160 so as to fluidly couple the hydraulic fluid reservoir 150 to the actuation cylinder 160. The hydraulic fluid reservoir 150 is open to an ambient pressure 190.

The hydraulic system 199 includes any suitable hydraulic pump 151 coupled to the hydraulic fluid reservoir 150. The hydraulic pump 151 is disposed between the hydraulic fluid reservoir 150 and the hydraulic lock 100, so as to create an actuation hydraulic fluid flow 200 (FIG. 2) from the hydraulic fluid reservoir 150, through the hydraulic lock 100, to the actuation cylinder 160, where the actuation hydraulic fluid flow 200 opens the first check valve 113 and the second check valve 130. A selector switch 820 is also provided to actuate and de-actuate the hydraulic pump 151.

The hydraulic system 199 also includes any suitable diverter valve 152 disposed between the hydraulic pump 151 and the hydraulic lock 100. The diverter valve is coupled to the hydraulic pump 151 and the hydraulic fluid reservoir 150 for directing fluid flow (depending on whether the hydraulic pump 151 is actuated) to the actuation cylinder 160 or to the hydraulic fluid reservoir 150. For example, the diverter valve 152 selectively directs the actuation hydraulic fluid flow 200 from the hydraulic pump 151 to the actuation cylinder 160, and a return hydraulic fluid flow 400 from the actuation cylinder 160 to the hydraulic fluid reservoir 150, bypassing the hydraulic pump 151. In this example, the hydraulic fluid reservoir 150 and the actuation cylinder 160 are fluidically coupled to each other by a single hydraulic path 187 and the hydraulic lock 100 forms a portion of the single hydraulic path 187.

In the example illustrated in the figures, the flow control valve 110 and the second check valve 130 are configured to passively lock the actuation cylinder 160 in a predetermined extended or retracted position 550 (see FIG. 5); in other aspects, such as where the operator handle 145 is provided, in any other suitable position between an over-extended position 560 (see FIG. 3) and a fully retracted position 570 (see FIG. 1) of the actuation cylinder 160. The hydraulic system 199 includes a passive mechanical lock 800 coupled to the actuation cylinder 160, where the passive mechanical lock 800 and the hydraulic lock 100 are arranged in parallel to provide two distinct load paths for maintaining the actuation cylinder 160 in a predetermined extended or retracted position 550. The two distinct load paths for maintaining the actuation cylinder 160 in a predetermined extended or retracted position 550 provides for a redundant locking of the actuation cylinder 160 (and hence, locking of a respective engine maintenance access door 811, 812 in an open position) in the event the passive mechanical lock 800 malfunctions.

Referring to FIGS. 1, 2, 3, 4, 5, and 6, an operation of the hydraulic lock 100 and the hydraulic system 199 for opening and maintaining an opened position of an engine maintenance access door 811, 812 (see FIG. 8C, where engine maintenance access door 811 is in an open position and engine maintenance access door 812 is in a closed position) will be described. Referring to FIG. 1, the hydraulic system 199 is illustrated with the actuation cylinder 160 in the fully retracted position 570 (such as when the respective engine maintenance access door 811, 812 is in a closed position—see engine maintenance access door 812 in FIG. 8C). Here the fluidic pressure in the single hydraulic path 187 between the hydraulic fluid reservoir 150 and the aperture 134 of the second check valve 130 is at ambient pressure 190. The fluidic pressure in the single hydraulic path 187 between the second ball 135 and the actuation cylinder 160 is at a residual pressure 510 exerted on the second ball 135 by the actuation cylinder 160.

Referring to FIG. 2, upon actuation of the selector switch 820 (FIG. 8B), the hydraulic pump 151 pumps creates the actuation hydraulic fluid flow 200 through the single hydraulic path 187 to extend the actuation cylinder 160 and, e.g., open the engine maintenance access door 811, 812 (see engine maintenance access door 811 in FIG. 8C). The actuation hydraulic fluid flow 200 overcomes the biasing force of the first resilient member 156 and the second resilient member 136 to open both the first check valve 113 (the actuation hydraulic fluid flow 200 is restricted by the flow restrictor 114 such that a majority of the actuation hydraulic fluid flow 200 passes through the flow control valve 110 through the first check valve 113) and the second check valve 130 so that the actuation hydraulic fluid flow 200 enters the hydraulic actuator for extending a piston 220 of the actuation cylinder 160 in an extension direction 270. As illustrated in FIG. 2, a pressure of the actuation hydraulic fluid flow 200 may incrementally decrease from a pump pressure 290, to a first decreased pressure 291 (e.g., decreased from the pump pressure 290 by a pressure loss dp_1 generated by one or more of the flow restrictor 114 and the first check valve 113), to a second decreased pressure 292 (e.g., decreased from the first decreased pressure 291 by a pressure loss dp_2 generated by the second check valve 130).

Referring to FIG. 3, the selector switch 820 (FIG. 8B) is actuated, and the hydraulic pump 151 continues to create the actuation hydraulic fluid flow 200, so that the piston 220 of the actuation cylinder 160 is over-extended and passes, during extension of the piston 220, the passive mechanical lock 800. The passive mechanical lock 800 may be any suitable passive locking mechanism, such as a cam detent locking mechanism, that is actuated and de-actuated by the extension of the piston 220 past the passive mechanical lock 800. For example, a first passing of the piston 220 past (e.g., such as when over-extended as illustrated in FIG. 3) the passive mechanical lock 800 may cause the passive mechanical lock 800 to actuate so that as the piston 220 is moved in a retraction direction the piston seats on the passive mechanical lock 800 and is prevented from further retraction movement. A second extension of the piston (e.g., again extended to the over-extended position of FIG. 3) unseats the piston 220 from the passive mechanical lock and causes a de-actuation of the passive mechanical lock 800, such that upon retraction of the piston 220 from the over-extended position the piston 220 is allowed to retract past the passive mechanical lock 800. At the over-extended position of the piston 220 the pressure of the actuation hydraulic fluid flow 200 within the single hydraulic path 187 is the pump pressure 290.

Referring to FIG. 4, the selector switch 820 (FIG. 8B) is de-actuated to stop the hydraulic pump 151 from creating the actuation hydraulic fluid flow 200 (FIGS. 2 and 3). Upon stopping of the hydraulic pump 151, the diverter valve 152 changes a path of hydraulic fluid flow (e.g., a return hydraulic fluid flow 400) such that the inlet 101 is fluidically coupled to the hydraulic fluid reservoir and bypasses the hydraulic pump 151 (see FIG. 1). Also upon stopping of the hydraulic pump 151, the over-extended position of the piston 220 (illustrated in FIG. 3) begins to move in a retraction direction 470 (e.g., under load of the respective engine maintenance access door 811, 812—FIG. 8C) to create hydraulic fluid pressure 415 within the actuation cylinder 160 such that hydraulic fluid is pushed, by the piston 220, out of the actuation cylinder 160 to create the return hydraulic fluid flow 400.

As illustrated in FIGS. 3 and 4, at the over-extended position of the piston 220, both the first check valve 113 and the second check valve 130 are open (e.g., the respective balls are not coupled with the respective ball seating surface). The flow control valve 110 and the second check valve 130 are configured to hold the second check valve 130 open when the return hydraulic fluid flow 400 passes from the second check valve 130 to the flow control valve 110 (e.g., from the actuation cylinder 160 to the hydraulic fluid reservoir 150). For example, when the return hydraulic fluid flow 400 is applied in a direction from the second outlet 132 to the first inlet 111 (or to the hydraulic fluid reservoir 150) and the second check valve 130 is in an open configuration (e.g., such as at a point in time when the actuation hydraulic fluid flow 200 stops and/or at the creation of the return hydraulic fluid flow 400) the flow control valve 110 is configured so that the first check valve 113 closes (e.g., under the biasing force of the first resilient member 156) and directs fluid flow through the flow restrictor 114.

Also, when the return hydraulic fluid flow 400 is applied in a direction from the second outlet 132 to the first inlet 111 and the second check valve 130 is in an open configuration the second check valve 130 is configured (e.g., with different surface areas of the portions 610A, 610B of the surface 610 as described herein) so that the second ball 135 is held away from the second ball seating surface 133 by hydraulic fluid gauge pressure ($P_{manifold}$) 601 in the second manifold 620 (FIG. 6) effected by the flow restrictor 114 (e.g., by a hydraulic fluid back pressure 410 generated by the flow restrictor 114) and a pressure bias (e.g., differential force ($\Delta F$) 600) on the second ball 135 of the second check valve 130. For example, the flow control valve 110 and the second check valve 130 are configured to hold the second check valve 130 open when a pressure based force (F1) 600A generated by the hydraulic fluid gauge pressure ($P_{manifold}$) 601 in the second manifold 620 that acts (FIG. 6) on a portion 610A (FIG. 6) of the second ball 135 of the second check valve 130, effected by the hydraulic fluid back pressure 410 generated by the flow restrictor 114 between the flow control valve 110 and the second check valve 130, is less than another pressure based force (F2) 600B generated from the second manifold 620 hydraulic fluid gauge pressure ($P_{manifold}$) 601 that acts (FIG. 6) on another portion 610B (FIG. 6) of the second ball 135 of the second check valve 130.

Referring to FIG. 5, the flow control valve 110 and the second check valve 130 are configured so that the second check valve 130 closes when the return hydraulic fluid flow 400 from the second check valve 130 to the flow control valve 110 (or from the actuation cylinder 160 to the hydraulic fluid reservoir 150) stops. The return hydraulic fluid flow 400 stops when, as described above, the piston 220 seats on the passive mechanical lock 800 and the piston is held in the extended or retracted position 550 by the passive mechanical lock 800. The seating of the piston 220 on the passive mechanical lock 800 relieves the hydraulic fluid pressure 415 (FIG. 4) to a residual pressure 510. The residual pressure 510 is such that the differential pressure based force 600 (FIG. 6) exerted on the second ball 135 of the second check valve 130, effected by the flow control valve 110, is decreased to substantially zero or less than a biasing force ($F_{bias}$) 602 of the second resilient member 136 so that the second check valve 130 closes (e.g., the second ball 135 couples with the second ball seating surface 133 at least under the biasing force of the second resilient member 136) to actuate the hydraulic lock 100. For example, when a hydraulic fluid pressure 415 (FIG. 4) is applied to the second outlet 132 (such as upon a malfunction of the passive mechanical lock 800) and the second check valve 130 is in a closed configuration, the second check valve 130 is configured so that the second ball 135 is seated against the second ball seating surface 133, at least in part by the hydraulic fluid pressure 415 (FIG. 4), so as to substantially prevent fluid flow through the second check valve 130 and prevent further movement of the piston 220 (and the respective engine maintenance access door 811, 812 supported thereby—see FIG. 8C) in the retraction direction 470 (FIG. 4).

Referring to FIGS. 1, 2, 3, 4, 5, and 6, an operation of the hydraulic lock 100 and the hydraulic system 199 for closing an engine maintenance access door 811, 812 from the opened position (see FIG. 8C, where engine maintenance access door 811 is in an open position and engine maintenance access door 812 is in a closed position) will be described. Referring to FIG. 5, as noted above, the piston 220 of the actuation cylinder 160 is seated on the passive mechanical lock 800 so that the piston 220 is held in the extended or retracted position 550. To de-actuate the passive mechanical lock 800 and open the hydraulic lock 100 so that the engine maintenance access door 811, 812 closes, the selector switch 820 is actuated so that the hydraulic pump 151 creates the actuation hydraulic fluid flow 200 (FIG. 2). The actuation hydraulic fluid flow 200 causes the first check valve 113 and the second check valve 130 to open (see FIG. 2) and the piston 220 to move into the over-extended position 560 (FIG. 3), as described above. This movement of the piston 220 to unseat the piston 220 from the passive mechanical lock 800 is the second extension of the piston referred to above, which causes a de-actuation of the passive mechanical lock 800, such that upon retraction of the piston 220 (such as under load of the engine maintenance access door 811, 812—see FIG. 4) from the over-extended position the piston 220 is allowed to retract past the passive mechanical lock 800 (see FIG. 6).

As described above, the first check valve 113 is closed and directs fluid flow through the flow restrictor 114, where the second ball 135 of the second check valve 130 is held away from the second ball seating surface 133 by hydraulic fluid gauge pressure ($P_{manifold}$) 601 in the second manifold effected by the flow restrictor 114 (e.g., by a hydraulic fluid back pressure 410 generated by the flow restrictor 114) and the pressure bias (e.g., differential pressure based force ($\Delta F$) 600) on the second ball 135 of the second check valve 130. The piston 220 continues to move in the retraction direction 470, creating the return hydraulic fluid flow 400 (e.g., flowing into the hydraulic fluid reservoir 150) until the piston 220 is in the fully retracted position 570. When the piston 220 is in the fully retracted position 570, the return hydraulic fluid flow 400 stops (as shown in FIG. 1) allowing the second check valve 130 to close leaving the fluidic pressure in the single hydraulic path 187 between the hydraulic fluid reservoir 150 and the aperture 134 of the second check valve 130 at the ambient pressure 190 and the fluidic pressure in the single hydraulic path 187 between the second ball 135 and the actuation cylinder 160 at the residual pressure 510.

Referring now to FIGS. 1-7, a method for operating a hydraulic lock 100 in a hydraulic system 199 will be described. The method includes blocking a return hydraulic fluid flow 400 through a flow control valve 110 with a first check valve 113 (FIG. 7, Block 700) of the flow control valve 110. The first check valve 113 directs the return hydraulic fluid flow 400 through a flow restrictor 114, of the flow control valve 110. The method also includes holding a second ball 135 of a second check valve 130 away from a second ball seating surface 133 of the second check valve 130 (FIG. 7, Block 710), against a biasing force ($F_{bias}$) 602 of the second resilient member 136 biasing the second ball 135 towards the second ball seating surface 133, with at least a hydraulic fluid gauge pressure ($P_{manifold}$) 601 effected by the flow restrictor 114 (e.g., by a hydraulic fluid back pressure 410 generated by the flow restrictor 114). The method further includes seating the second ball 135 against the second ball seating surface 133 to close a second inlet 131 of the second check valve 130 (FIG. 7, Block 720) when the hydraulic fluid back pressure 410 is substantially the same as another hydraulic fluid pressure 415 at a second outlet 132 of the second check valve 130, such that the differential pressure based force 600 (FIG. 6) exerted on the second ball 135 of the second check valve 130, effected by the flow control valve 110, is decreased to substantially zero or less than a biasing force ($F_{bias}$) 602 of the second resilient member 136 so that the second check valve 130 closes.

When a return hydraulic fluid flow 400 is applied to the second outlet 132 and the second check valve 130 is in a closed configuration, the method further comprises substantially preventing fluid flow through the second check valve 130 (FIG. 7, Block 730) where the second ball 135 is seated against the second ball seating surface 133 at least in part by the return hydraulic fluid pressure. The method further comprises holding the second check valve 130 open (FIG. 7, Block 735) when a pressure based force (F1) 600A generated by the manifold 620 hydraulic fluid gauge pressure ($P_{manifold}$) 601 that acts on the portion 610A of the second ball 135 of the second check valve 130, effected by a hydraulic fluid pressure generated by the flow restrictor 114 between the flow control valve 110 and the second check valve 130, is less than another pressure based force (F2) 600B generated by the manifold 620 hydraulic fluid gauge pressure ($P_{manifold}$) 601 that acts on another portion 610B of the second ball 135 of the second check valve 130; where, the second check valve is closed when a flow of hydraulic fluid from the second check valve 130 to the flow control valve 110 stops (or from the actuation cylinder 160 to the hydraulic fluid reservoir 150 stops). As described, herein, the differential pressure based force ($\Delta F$) 600 (e.g., the difference between manifold 620 hydraulic fluid gauge pressure 601 acting on portion 610A and the other portion 610B of surface 610) is effected with the stem 137 extending from the second ball 135.

As described above, closing of the second check valve 130, when the return hydraulic fluid flow 400 stops (such as when the piston 220 seats on the passive mechanical lock 800) passively locks hydraulic fluid flow (e.g., the return hydraulic fluid flow 400) within the hydraulic system 199 (FIG. 7, Block 740). The return hydraulic fluid flow 400 may also be started or stopped (e.g., when the passive mechanical lock 800 is de-actuated) by one or more of manual opening and manual closing of the second check valve 130 with the stem 137 (e.g., such as with the operator handle 145 shown in FIG. 1). The locking of the return hydraulic fluid flow 400 effects holding open a door (such as a respective engine maintenance access door 811, 812) with the hydraulic lock 100 (FIG. 7, Block 750).

The following examples are provided in accordance with the aspects of the present disclosure:

A1. A hydraulic lock for a hydraulic system, the hydraulic lock comprising:

a flow control valve having a first inlet, a first outlet, a first check valve and a flow restrictor, each of the first check valve and the flow restrictor being communicably coupled to the first inlet and the first outlet and being arranged in parallel between the first inlet and the first outlet; and a second check valve having a second inlet and a second outlet, the second inlet being communicably coupled to the first outlet, the second check valve further having a second ball seating surface having an aperture there through, a second ball, and a second resilient member biasing the second ball towards the second ball seating surface to seal the aperture, the aperture being communicably coupled to the second inlet and the second outlet.

A2. The hydraulic lock of paragraph A1, wherein the second inlet, the second outlet and the aperture form a fluid flow path through the second check valve.

A3. The hydraulic lock of one or more of the preceding paragraphs, wherein when a return hydraulic fluid flow is applied in a direction from the second outlet to the first inlet and the second check valve is in an open configuration, the flow control valve is configured so that the first check valve closes and directs fluid flow through the flow restrictor; and the second check valve is configured so that the second ball is held away from the second ball seating surface by hydraulic fluid gauge pressure, in a second manifold of the second check valve, effected by the flow restrictor and a pressure bias on the second ball of the second check valve.

A4. The hydraulic lock of one or more of the preceding paragraphs, wherein when a hydraulic fluid pressure is applied to the second outlet and the second check valve is in a closed configuration, the second check valve is configured so that the second ball is seated against the second ball seating surface, at least in part by the hydraulic fluid pressure, so as to substantially prevent fluid flow through the second check valve.

A5. The hydraulic lock of one or more of the preceding paragraphs, wherein the flow control valve and the second check valve are configured to hold the second check valve open when a return hydraulic fluid flow passes from the second check valve to the flow control valve.

A6. The hydraulic lock of one or more of the preceding paragraphs, wherein the flow control valve and the second check valve are configured to hold the second check valve open when a pressure based force on a portion of the second ball of the second check valve, effected by a hydraulic fluid gauge pressure generated by the flow restrictor between the flow control valve and the second check valve, is less than another pressure based force on another portion of the second ball of the second check valve.

A7. The hydraulic lock of one or more of the preceding paragraphs, wherein the flow control valve and the second check valve are configured so that the second check valve closes when a return hydraulic fluid flow from the second check valve to the flow control valve stops.

A8. The hydraulic lock of one or more of the preceding paragraphs, wherein the flow control valve and the second check valve are configured so that the second check valve closes when a differential pressure based force exerted on the second ball of the second check valve, effected by the flow control valve, is substantially zero or less than a biasing force of the second resilient member.

A9. The hydraulic lock of one or more of the preceding paragraphs, wherein the second ball of the second check valve includes a stem that extends from the second ball in a direction substantially opposite the second ball seating surface so as to extend, through a second check valve housing of the second check valve, to an ambient pressure surrounding the second check valve housing.

A10. The hydraulic lock of one or more of the preceding paragraphs, wherein the stem, in communication with the ambient pressure, is configured to effect a differential pressure based force between at least a portion of a surface of the second ball adjacent the stem and another portion of the surface of the second ball facing the second inlet.

A11. The hydraulic lock of one or more of the preceding paragraphs, wherein an operator handle is coupled to a portion of the stem disposed in the ambient pressure to effect one or more of manual opening and manual closing of the second check valve.

A12. The hydraulic lock of one or more of the preceding paragraphs, wherein the flow control valve and the second check valve are configured to passively lock hydraulic fluid flow within the hydraulic system.

A13. The hydraulic lock of one or more of the preceding paragraphs, wherein the hydraulic system is a power door operating system.

B1. A hydraulic system comprising:

a hydraulic fluid reservoir;

an actuation cylinder; and a hydraulic lock disposed between the hydraulic fluid reservoir and the actuation cylinder so as to fluidly couple the hydraulic fluid reservoir to the actuation cylinder, the hydraulic lock including a flow control valve having a first inlet, a first outlet, a first check valve and a flow restrictor, each of the first check valve and the flow restrictor being communicably coupled to the first inlet and the first outlet and being arranged in parallel between the first inlet and the first outlet; and a second check valve having a second inlet and a second outlet, the second inlet being communicably coupled to the first outlet, the second check valve further having a ball seating surface having an aperture there through, a ball, and a resilient member biasing the ball towards the ball seating surface to seal the aperture, the aperture being communicably coupled to the second inlet and the second outlet.

B2. The hydraulic system of paragraph B 1, wherein the second inlet, the second outlet and the aperture form a fluid flow path through the second check valve.

B3. The hydraulic system of one or more of the preceding paragraphs, wherein when a hydraulic fluid flow is applied in a direction from the actuation cylinder to the hydraulic fluid reservoir and the second check valve is in an open configuration, the flow control valve is configured so that the first check valve closes and directs fluid flow through the flow restrictor; and the second check valve is configured so that the ball is held away from the ball seating surface by hydraulic fluid gauge pressure, in a second manifold of the second check valve, effected by the flow restrictor and a pressure based force bias on the second ball of the second check valve.

B4. The hydraulic system of one or more of the preceding paragraphs, wherein when a hydraulic fluid pressure is applied by the actuation cylinder to the second outlet and the second check valve is in a closed configuration, the second check valve is configured so that the second ball is seated against the second ball seating surface, at least in part by the hydraulic fluid pressure, so as to substantially prevent fluid flow through the second check valve and lock the actuation cylinder in a predetermined extended or retracted position.

B5. The hydraulic system of one or more of the preceding paragraphs, wherein the flow control valve and the second check valve are configured to hold the second check valve open when a return hydraulic fluid flow passes from the actuation cylinder to the hydraulic fluid reservoir.

B6. The hydraulic system of one or more of the preceding paragraphs, wherein the flow control valve and the second check valve are configured to hold the second check valve open when a pressure based force on a portion of the second ball of the second check valve, effected by a hydraulic fluid gauge pressure generated by the flow restrictor between the flow control valve and the second check valve, is less than another pressure based force on another portion of the second ball of the second check valve.

B7. The hydraulic system of one or more of the preceding paragraphs, wherein the flow control valve and the second check valve are configured so that the second check valve closes when a return hydraulic fluid flow from the actuation cylinder to the hydraulic fluid reservoir stops.

B8. The hydraulic system of one or more of the preceding paragraphs, wherein the flow control valve and the second check valve are configured so that the second check valve closes when a differential pressure based force exerted on the second ball of the second check valve, effected by the flow control valve, is substantially zero or less than a biasing force of the second resilient member.

B9. The hydraulic system of one or more of the preceding paragraphs, wherein the second ball of the second check valve includes a stem that extends from the second ball in a direction substantially opposite the second ball seating surface so as to extend, through a second check valve housing of the second check valve, to an ambient pressure surrounding the second check valve housing.

B10. The hydraulic system of one or more of the preceding paragraphs, wherein the stem, in communication with the ambient pressure, is configured to effect a differential pressure based force between at least a portion of a surface of the second ball adjacent the stem and another portion of the surface of the second ball facing the second inlet.

B11. The hydraulic system of one or more of the preceding paragraphs, wherein an operator handle is coupled to a portion of the stem disposed in the ambient pressure to effect one or more of manual opening and manual closing of the second check valve.

B12. The hydraulic system of one or more of the preceding paragraphs, wherein the flow control valve and the second check valve are configured to passively lock the actuation cylinder in a predetermined extended or retracted position.

B13. The hydraulic system of one or more of the preceding paragraphs, further comprising a passive mechanical lock coupled to the actuation cylinder, where the passive mechanical lock and the hydraulic lock are arranged in parallel to provide two distinct load paths for maintaining the actuation cylinder in a predetermined extended or retracted position.

B14. The hydraulic system of one or more of the preceding paragraphs, wherein the hydraulic fluid reservoir and the actuation cylinder are fluidically coupled to each other by a single hydraulic path and the hydraulic lock forms a portion of the single hydraulic path.

B15. The hydraulic system of one or more of the preceding paragraphs, further comprising a hydraulic pump disposed between the hydraulic fluid reservoir and the hydraulic lock, so as to create an actuation hydraulic fluid flow from the hydraulic fluid reservoir, through the hydraulic lock, to the actuation cylinder, where the actuation hydraulic fluid flow opens the first check valve and the second check valve.

B16. The hydraulic system of one or more of the preceding paragraphs, further comprising a diverter valve disposed between the hydraulic pump and the hydraulic lock, the diverter valve selectively directs the actuation hydraulic fluid flow from the hydraulic pump to the actuation cylinder, and a return hydraulic fluid flow from the actuation cylinder to the hydraulic fluid reservoir, bypassing the hydraulic pump.

B17. The hydraulic system of one or more of the preceding paragraphs, wherein the hydraulic fluid reservoir is open to an ambient pressure.

B18. The hydraulic system of one or more of the preceding paragraphs, wherein the hydraulic system is a power door operating system.

B19. The hydraulic system of one or more of the preceding paragraphs, wherein the power door operating system comprises an aircraft engine door operating system.

C1. A method for operating a hydraulic lock in a hydraulic system, the method comprising:

blocking a return hydraulic fluid flow through a flow control valve with a first check valve of the flow control valve where the first check valve directs the return hydraulic fluid flow through a flow restrictor, of the flow control valve, the first check valve and the flow restrictor being arranged in parallel between a first inlet and a first outlet of the flow control valve;

holding a second ball of a second check valve away from a second ball seating surface of the second check valve, against a biasing force of a second resilient member biasing the second ball towards the second ball seating surface, with at least a hydraulic fluid gauge pressure, in a second manifold of the second check valve, effected by the flow restrictor; and seating the second ball against the second ball seating surface to close a second inlet of the second check valve when a differential pressure based force exerted on the second ball of the second check valve, effected by the flow control valve, is substantially zero or less than a biasing force of the second resilient member.

C2. The method of paragraph C1, wherein when a return hydraulic fluid flow is applied to the second outlet and the second check valve is in a closed configuration, the method further comprises substantially preventing fluid flow through the second check valve where the second ball is seated against the second ball seating surface at least in part by the return hydraulic fluid pressure.

C3. The method of one or more of the preceding paragraphs, further comprising holding the second check valve open when a pressure based force on a portion of the second ball of the second check valve, effected by a hydraulic fluid gauge pressure generated by the flow restrictor between the flow control valve and the second check valve, is less than another pressure based force on another portion of the second ball of the second check valve.

C4. The method of one or more of the preceding paragraphs, further comprising closing the second check valve when a flow of hydraulic fluid from the second check valve to the flow control valve stops.

C5. The method of one or more of the preceding paragraphs, further comprising effecting a differential pressure based force, with a stem extending from the second ball in a direction substantially opposite the second ball seating surface so as to extend into an ambient pressure surrounding a second check valve housing, between at least a portion of a surface of the second ball from which the stem extends and another portion of the surface of the second ball facing the second inlet.

C6. The method of one or more of the preceding paragraphs, further comprising one or more of manual opening and manual closing of the second check valve with a stem extending from the second ball.

C7. The method of one or more of the preceding paragraphs, further comprising passively locking hydraulic fluid flow within the hydraulic system with the flow control valve and the second check valve.

C8. The method of one or more of the preceding paragraphs, wherein the hydraulic system is a power door operating system and the method further comprises holding open a door with the hydraulic lock.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 7, referred to above, the blocks may represent operations and/or portions thereof and lines connecting the various blocks do not imply any particular order or dependency of the operations or portions thereof. Blocks represented by dashed lines, if any, indicate alternative operations and/or portions thereof. Dashed lines, if any, connecting the various blocks represent alternative dependencies of the operations or portions thereof. It will be understood that not all dependencies among the various disclosed operations are necessarily represented. FIG. 7 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es), system(s), and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A hydraulic lock for a hydraulic system, the hydraulic lock comprising:
a flow control valve having a first inlet, a first outlet, a first check valve and a flow restrictor, each of the first check valve and the flow restrictor being communicably coupled to the first inlet and the first outlet and being arranged in parallel between the first inlet and the first outlet; and
a second check valve having a second inlet and a second outlet, the second inlet being communicably coupled to the first outlet, the second check valve further having:
a second ball seating surface having an aperture there through,
a second ball having an inlet side with an inlet side hydraulic area and an outlet side with an outlet side hydraulic area, where the inlet side hydraulic area is greater than the outlet side hydraulic area, and
a second resilient member biasing the second ball towards the second ball seating surface to seal the aperture, where the aperture is communicably coupled to the second inlet and the second outlet.

2. The hydraulic lock of claim 1, wherein when a return hydraulic fluid flow is applied in a direction from the second outlet to the first inlet and the second check valve is in an open configuration,
the flow control valve is configured so that the first check valve closes and directs fluid flow through the flow restrictor; and
the second check valve is configured so that the second ball is held away from the second ball seating surface by hydraulic fluid gauge pressure, in a second manifold of the second check valve, effected by the flow restrictor and a pressure based force bias on the second ball of the second check valve.

3. The hydraulic lock of claim 1, wherein when a hydraulic fluid pressure is applied to the second outlet and the second check valve is in a closed configuration,
the second check valve is configured so that the second ball is seated against the second ball seating surface, at least in part by the hydraulic fluid pressure, so as to substantially prevent fluid flow through the second check valve.

4. The hydraulic lock of claim 1, wherein the flow control valve and the second check valve are configured to hold the second check valve open when a return hydraulic fluid flow passes from the second check valve to the flow control valve.

5. The hydraulic lock of claim 1, wherein the flow control valve and the second check valve are configured to hold the second check valve open when a pressure based force on a portion of the second ball of the second check valve, effected by a hydraulic fluid gauge pressure generated by the flow restrictor between the flow control valve and the second check valve, is less than another pressure based force on another portion of the second ball of the second check valve.

6. The hydraulic lock of claim 1, wherein the flow control valve and the second check valve are configured so that the second check valve closes when a return hydraulic fluid flow from the second check valve to the flow control valve stops.

7. The hydraulic lock of claim 1, wherein the flow control valve and the second check valve are configured so that the second check valve closes when a differential pressure based force exerted on the second ball of the second check valve, effected by the flow control valve, is substantially zero or less than a biasing force of the second resilient member.

8. A hydraulic lock for a hydraulic system, the hydraulic lock comprising:
a flow control valve having a first inlet, a first outlet, a first check valve and a flow restrictor, each of the first check valve and the flow restrictor being communicably coupled to the first inlet and the first outlet and being arranged in parallel between the first inlet and the first outlet; and
a second check valve having a second inlet and a second outlet, the second inlet being communicably coupled to the first outlet, the second check valve further having:
a second ball seating surface having an aperture there through,
a second ball, and
a second resilient member biasing the second ball towards the second ball seating surface to seal the aperture, the aperture being communicably coupled to the second inlet and the second outlet;
wherein the second ball of the second check valve includes a stem that extends from the second ball in a direction substantially opposite the second ball seating surface so as to extend, through a second check valve housing of the second check valve, to an ambient pressure surrounding the second check valve housing.

9. The hydraulic lock of claim 8, wherein an operator handle is coupled to a portion of the stem disposed in the ambient pressure to effect one or more of manual opening and manual closing of the second check valve.

10. A hydraulic system comprising:
a hydraulic fluid reservoir;
an actuation cylinder; and
a hydraulic lock disposed between the hydraulic fluid reservoir and the actuation cylinder so as to fluidly couple the hydraulic fluid reservoir to the actuation cylinder, the hydraulic lock including
a flow control valve having a first inlet, a first outlet, a first check valve and a flow restrictor, each of the first check valve and the flow restrictor being communicably coupled to the first inlet and the first outlet and being arranged in parallel between the first inlet and the first outlet; and
a second check valve having a second inlet and a second outlet, the second inlet being communicably coupled to the first outlet, the second check valve further having:
a ball seating surface having an aperture there through,
a ball having a hydraulic fluid reservoir side with a reservoir side hydraulic area and an actuation cylinder side with an actuator side hydraulic area, where the reservoir side hydraulic area is greater than the actuator side hydraulic area,
and a resilient member biasing the ball towards the ball seating surface to seal the aperture, the aperture being communicably coupled to the second inlet and the second outlet.

11. The hydraulic system of claim 10, wherein the flow control valve and the second check valve are configured to passively lock the actuation cylinder in a predetermined extended or retracted position.

12. The hydraulic system of claim 10, wherein the hydraulic fluid reservoir and the actuation cylinder are fluidically coupled to each other by a single hydraulic path and the hydraulic lock forms a portion of the single hydraulic path.

13. The hydraulic system of claim 10, further comprising a hydraulic pump disposed between the hydraulic fluid reservoir and the hydraulic lock, so as to create an actuation hydraulic fluid flow from the hydraulic fluid reservoir, through the hydraulic lock, to the actuation cylinder, where the actuation hydraulic fluid flow opens the first check valve and the second check valve.

14. The hydraulic system of claim 13, further comprising a diverter valve disposed between the hydraulic pump and the hydraulic lock, the diverter valve selectively directs
 the actuation hydraulic fluid flow from the hydraulic pump to the actuation cylinder, and
 a return hydraulic fluid flow from the actuation cylinder to the hydraulic fluid reservoir, bypassing the hydraulic pump.

15. A hydraulic system comprising:
 a hydraulic fluid reservoir;
 an actuation cylinder;
 a hydraulic lock disposed between the hydraulic fluid reservoir and the actuation cylinder so as to fluidly couple the hydraulic fluid reservoir to the actuation cylinder, the hydraulic lock including
  a flow control valve having a first inlet, a first outlet, a first check valve and a flow restrictor, each of the first check valve and the flow restrictor being communicably coupled to the first inlet and the first outlet and being arranged in parallel between the first inlet and the first outlet; and
  a second check valve having a second inlet and a second outlet, the second inlet being communicably coupled to the first outlet, the second check valve further having a ball seating surface having an aperture there through, a ball, and a resilient member biasing the ball towards the ball seating surface to seal the aperture, the aperture being communicably coupled to the second inlet and the second outlet; and
 a passive mechanical lock coupled to the actuation cylinder, where the passive mechanical lock and the hydraulic lock are arranged in parallel to provide two distinct load paths for maintaining the actuation cylinder in a predetermined extended or retracted position.

16. A method for operating a hydraulic lock in a hydraulic system, the method comprising:
 blocking a return hydraulic fluid flow through a flow control valve with a first check valve of the flow control valve where the first check valve directs the return hydraulic fluid flow through a flow restrictor, of the flow control valve, the first check valve and the flow restrictor being arranged in parallel between a first inlet and a first outlet of the flow control valve;
 holding a second ball of a second check valve away from a second ball seating surface of the second check valve, against a biasing force of a second resilient member biasing the second ball towards the second ball seating surface, with at least a hydraulic fluid gauge pressure, in a second manifold of the second check valve, effected by the flow restrictor; and
 seating the second ball against the second ball seating surface to close a second inlet of the second check valve when a differential pressure based force exerted on the second ball of the second check valve is substantially zero or less than a biasing force of the second resilient member, where the differential pressure based force is effected by the flow control valve and a differential hydraulic surface area on opposite sides of the second ball where the second ball has an inlet side with an inlet side hydraulic area and an outlet side with an outlet side hydraulic area and the inlet side hydraulic area is greater than the outlet side hydraulic area.

17. The method of claim 16, further comprising holding the second check valve open when a pressure based force on a portion of the second ball of the second check valve, effected by a hydraulic fluid gauge pressure generated by the flow restrictor between the flow control valve and the second check valve, is less than another pressure based force on another portion of the second ball of the second check valve.

18. The method of claim 16, further comprising closing the second check valve when a flow of hydraulic fluid from the second check valve to the flow control valve stops.

19. The method of claim 16, further comprising one or more of manual opening and manual closing of the second check valve with a stem extending from the second ball.

20. The method of claim 16, wherein the hydraulic system is a power door operating system and the method further comprises holding open a door with the hydraulic lock.

* * * * *